(12) United States Patent
Yoo et al.

(10) Patent No.: US 11,885,996 B2
(45) Date of Patent: Jan. 30, 2024

(54) LIGHT-GUIDE OPTICAL ELEMENT

(71) Applicant: Shinyoptics Corp., Tainan (TW)

(72) Inventors: Jinn-Chou Yoo, Tainan (TW);
Chun-Min Chen, Tainan (TW);
Cheng-Shun Liao, Tainan (TW)

(73) Assignee: Shinyoptics Corp., Tainan (TW)

( * ) Notice: Subject to any disclaimer, the term of this patent is extended or adjusted under 35 U.S.C. 154(b) by 0 days.

(21) Appl. No.: 16/890,659

(22) Filed: Jun. 2, 2020

(65) Prior Publication Data
US 2021/0223456 A1 Jul. 22, 2021

(30) Foreign Application Priority Data
Jan. 20, 2020 (TW) .................................. 109101914

(51) Int. Cl.
*G02B 6/34* (2006.01)
*G02B 27/00* (2006.01)
*F21V 8/00* (2006.01)

(52) U.S. Cl.
CPC .......... *G02B 6/0031* (2013.01); *G02B 6/0055* (2013.01)

(58) Field of Classification Search
CPC ....... G02B 27/0056; G02B 6/34; G02B 6/327
See application file for complete search history.

(56) References Cited

U.S. PATENT DOCUMENTS

| | | | | |
|---|---|---|---|---|
| 10,690,831 | B2* | 6/2020 | Calafiore | G02B 6/0046 |
| 11,067,808 | B2* | 7/2021 | Schmulen | G02B 27/1046 |
| 2014/0314374 | A1* | 10/2014 | Fattal | G02B 6/30 385/33 |
| 2018/0172893 | A1* | 6/2018 | Fattal | G02B 6/0035 |
| 2019/0094445 | A1* | 3/2019 | Meng | G02B 6/0091 |
| 2019/0094981 | A1* | 3/2019 | Bradski | H04N 21/414 |
| 2019/0212487 | A1* | 7/2019 | Danziger | G02B 27/0172 |
| 2020/0183169 | A1* | 6/2020 | Peng | G02B 6/0055 |
| 2020/0326465 | A1* | 10/2020 | Gao | G02B 6/0076 |
| 2020/0400951 | A1* | 12/2020 | Zhang | B29D 11/00769 |
| 2021/0199971 | A1* | 7/2021 | Lee | G02B 27/0172 |

\* cited by examiner

*Primary Examiner* — Eric Wong

(57) ABSTRACT

A light-guide optical element is provided, including a transparent light-guide body having a first inclined surface and a second inclined surface disposed therein. The transparent light-guide body includes a side surface facing a first direction, and a first surface and a second surface which are adjacent to the side surface and face each other. The first inclined surface extends from the first surface to the second surface. The second inclined surface is located at the other side of the first inclined surface facing the side surface. The second inclined surface extends from the first surface to the second surface. When an input light enters the transparent light-guide body, the input light is partially reflected by the first inclined surface and the second inclined surface to form an output light output from the transparent light-guide body.

6 Claims, 4 Drawing Sheets

LIGHT-GUIDE OPTICAL ELEMENT

CROSS-REFERENCE TO RELATED APPLICATION

This application claims priority from Taiwan Patent Application No. 109101914, filed on Jan. 20, 2020, in the Taiwan Intellectual Property Office, the content of which is hereby incorporated by reference in its entirety for all purposes.

BACKGROUND

1. Field

The present disclosure relates to a light-guide optical element, particularly to a light-guide optical element that reflects part of the light to guide the light by a plurality of inclined surface in a light-guide body.

2. Description of the Related Art

A light-guide optical element (LOE) is generally applied to smartphones, head-up displays, video players, or other mobile display devices, such as head-mounted displays (HMD) in an augmented/virtual reality system. The light-guide optical element is an element in an entire imaging system. When a light source device in the imaging system outputs light, the light-guide optical element couples and outputs light to a user's eye by performing partial reflection/diffraction or total internal reflection for one or multiple reflections by a plurality of inclined reflection planes disposed therein at a specific angle and the inner surface of the entire element.

Miniaturization of devices is the trend for development. However, a light-guide element that is overly thin may be fragile when connected to other devices, especially at connection points. It may not attach steadily to an element since the light-guide element being overly thin.

In addition, an inner surface of a light-guide optical element also plays an essential role in the light-guiding process. Partial reflection/diffraction of light is performed by an inclined reflection plane, and the light is guided to the inner surface of the light-guide optical element. Moreover, the light is trapped therein by the total internal reflection of the inner surface. Eventually, the light is guided to the user's eye via multiple reflection/diffraction and total internal reflection. To make elements achieve this effect, high precision of the elements is an important condition.

As mentioned, light-guide optical elements in the prior art may be used to various kinds of display devices. However, most inclined reflection planes with high precision quality require an increase in the manufacturing cost, leading to the difficulty in increasing the production yield rate. Furthermore, the shape of the light-guide optical element which is overly thin will make it difficult to be stabilized when adhered to other devices. Hence, the present disclosure provides a light-guide optical element to solve the problems encountered by the light-guide optical elements in the prior art so as to improve the practical implementation in industries.

SUMMARY

According to the problems mentioned above, the subject of the present disclosure is to provide a light-guide optical element and achieve a light-guiding effect only by the inclined surfaces reflecting part of the light, in order to solve the problems that may be encountered in the prior art.

Based on the above subjects, the present disclosure provides a light-guide optical element, including a transparent light-guide body including a side surface facing a first direction, and a first surface and a second surface which are adjacent to the side surface and face each other, wherein, the transparent light-guide body includes a first inclined surface and a second inclined surface, the first inclined surface extends from the first surface to the second surface, the first inclined surface forms a first angle with the first surface, and a geometric center of the first inclined surface and a geometric center of the side surface are spaced apart with a first distance, and the second inclined surface extends from the first surface to the second surface, the second inclined surface is located at the other side of the first inclined surface facing the side surface and forms a second angle with the first surface, and a geometric center of the second inclined surface and the geometric center of the first inclined surface are spaced apart with a second distance, wherein, when an input light enters the transparent light-guide body, the input light is partially reflected by the first inclined surface and the second inclined surface to form an output light output to the outside of the transparent light guide.

Preferably, the first angle may be equal to the second angle.

Preferably, the light-guide optical element may further include a first reflective layer disposed on the first inclined surface and a second reflective layer disposed on the second inclined surface, wherein a reflectance of the first reflective layer is greater than a reflectance of the first inclined surface, and a reflectance of the second reflective layer is greater than a reflectance of the second inclined surface.

Preferably, the light-guide optical element may further include a third inclined surface extending from the first surface to the second surface, the third inclined surface is located at the other side of the second inclined surface facing the first inclined surface, the third inclined surface forms a third angle with the first surface, and a geometric center of the third inclined surface and the geometric center of the second inclined surface are spaced apart with a third distance. The second distance is not equal to the third distance.

Preferably, the first angle, the second angle, and the third angle may be equal.

Preferably, the light-guide optical element may further include a first reflective layer disposed on the first inclined surface, a second reflective layer disposed on the second inclined surface, and a third reflective layer disposed on the third inclined surface, wherein a reflectance of the first reflective layer is greater than a reflectance of the first inclined surface, a reflectance of the second reflective layer is greater than a reflectance of the second inclined surface, and a reflectance of the third reflective layer is greater than a reflectance of the third inclined surface.

Preferably, the reflectance of the third reflective layer may be greater than the reflectance of the second reflective layer and the reflectance of the first reflective layer.

Preferably, the light-guide optical element may further include a transparent member coating the first surface and the second surface, wherein a material of the transparent member includes glass plastic or resin.

The light-guide optical element according to the present disclosure use inclined surfaces having specific intervals to reflect input light so as to guide the light in a specific direction. The light-guide optical element according to the present disclosure has relatively few inclined surfaces, which may cause lower manufacturing cost for the inclined surfaces. In addition, the structural design is not limited to the use of total internal reflection. A specific range of inclination angles of the first surfaces and second surfaces may be tolerated in terms of the manufacturing process. This may effectively increase the production yield rate, thereby solving the aforementioned conventional problems.

DESCRIPTION OF THE PREFERRED EMBODIMENTS

To facilitate the review of the technical features, contents, advantages, and achievable effects of the present disclosure, the embodiments together with the drawings are described in detail as follows. However, the drawings are used only for the purpose of indicating and supporting the specification, which is not necessarily the real proportion and precise configuration after the implementation of the present disclosure. Therefore, the relations of the proportion and configuration of the attached drawings should not be interpreted to limit the actual scope of implementation of the present disclosure. For ease of understanding, the same elements in the following embodiments are described according to the same symbols.

In the description of the present disclosure, it should be noted that the terms "disposed", "connected", "adjacent", and the like should be considered to be general understanding unless there is a specific regulation or restriction. For instance, the term, "connected", may be referred to as "fixedly connected", "detachably connected", "integrally connected", or "directly connected"; it may also be referred to as being indirectly connected through an intermediate medium, or internally connected between the two elements. The specific meanings of the aforementioned terms in the present disclosure shall specifically be understood by a person of ordinary skill in the art.

Figure 1:
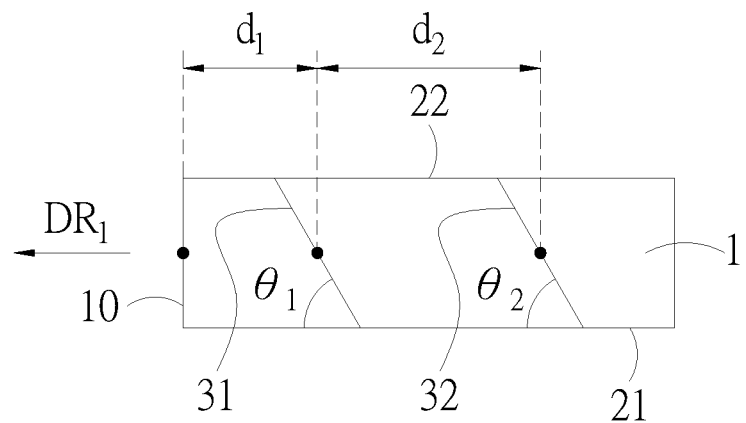
FIG. 1 is a schematic diagram of the structure of the first embodiment according to the light-guide optical element of the present disclosure.

Referring to FIG. 1, which is a schematic diagram of the structure of the first embodiment according to the light-guide optical element of the present disclosure.

As shown in the figure, the light-guide optical element of the present disclosure includes a transparent light-guide body 1, including a side surface 10, a first surface 21, a second surface 22, a first inclined surface 31, and a second inclined surface 32. Wherein the side surface 10 faces a first direction $DR_1$, and the first surface 21 and the second surface 22 are adjacent to the side surface 10 and face each other. In the present embodiment, the first surface 21 and the second surface 22 may be surfaces parallel to each other. In other embodiments, the first surface 21 and the second surface 22 may not be parallel to each other. For instance, the first surface 21 and the second surface 22 may be curved shapes that form a concave lens, so that an image light passing through the second surface 22 performs a refractive effect. The lens may be used as a corrective lens.

Wherein the first inclined surface 31 extends from the first surface 21 to the second surface 22 and forms a first angle $\theta_1$ with the first surface 21; the second inclined surface 32 extends from the first surface 21 to the second surface 22 and forms a second angle $\theta_2$ with the first surface 21. In the present embodiment, the first angle $\theta_1$ may be in a range from 35 to 70 degrees; the second angle $\theta_2$ may be in a range from 35 to 70 degrees. For instance, the first angle $\theta_1$ may be 45 degrees, and the second angle $\theta_2$ may be 45 degrees; that is, the first inclined surface 31 and the second inclined surface 32 are parallel to each other. In actual implementation, the angle may be 35 or 75 degrees depending on the design of a shape.

In addition, the geometric center of the first inclined surface 31 and the geometric center of the side surface 10 are spaced apart with a first distance $d_1$; the geometric center of the second inclined surface 32 and the geometric center of the first inclined surface 31 are spaced apart with a second distance. $d_2$ Different designs may be realized according to different applications.

Figure 2:
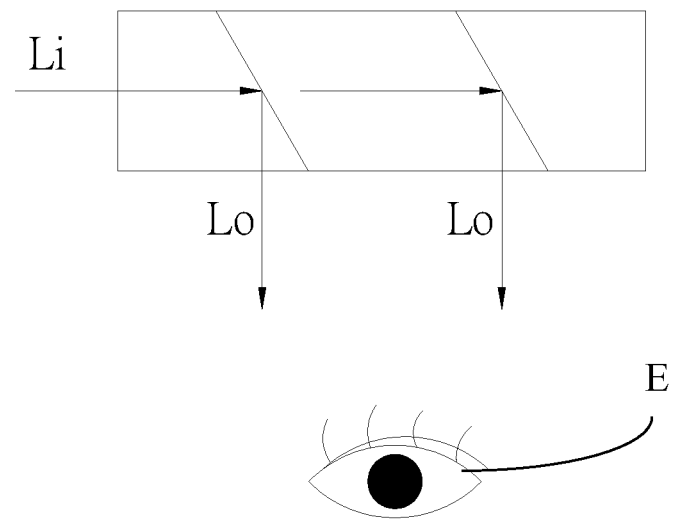
FIG. 2 is an schematic diagram of the operation of the first embodiment according to the light-guide optical element of the present disclosure.

Referring to FIG. 2, which is an schematic diagram of the operation of the first embodiment according to the light-guide optical element of the present disclosure.

As shown in the figure, an input light $L_i$ enters the light-guide optical element from the side surface 10. When the output light $L_i$ travels along an incident direction and contacts the first inclined surface 31, the input light $L_i$ is partially reflected by the first inclined surface 31 to form an output light $L_o$. The light leaves the transparent light-guide body 1 via the first surface 21 and enters the user's eye E. In addition, part of the input light $L_i$ may pass through the first inclined surface 31 and travels along the incident direction. When the input light $L_i$ contacts the second inclined surface 32, likewise, the light is partially reflected to form an output light $L_o$ which then leaves the transparent light-guide body 1 via the first surface 21 and enters the user's eye E. However, the present disclosure is not limited thereto. For instance, the input light $L_i$ is not limited to entering the transparent light-guide body 1 from the side surface 10. In contrast, the light may also enter from the first surface 21 to form the output light $L_o$ and then leave the transparent light-guide body 1 from the side surface 10.

Specifically, the design of the first distance $d_1$ and the second distance $d_2$ as mentioned previously is made according to the distance from the transparent light-guide body to the eye E to be focused on after the light leaves the transparent light-guide body 1. For instance, when the eye E is closer to the transparent light-guide body, the value difference between the first distance $d_1$ and the second distance $d_2$ may become larger. In contrast, when the eye E is further away from the transparent light-guide body 1 (e.g., greater than 500 mm), the values of the first distance $d_1$ and the second distance $d_2$ may become closer.

For the light-guide optical element in the first embodiment, the input light $L_i$ is partially reflected to the user's eye E by the first inclined surface 31 and the second inclined surface 32. It should be noted that, in the process of guiding the light, it is not limited that the first surface 21 and the second surface 22 must be on the path which the light is guided. Hence, the inclination of the first surface 21 and the second surface 22 may be allowed within a predetermined (or set) range, which may still make the light-guide optical element maintain the same function.

Figure 3:
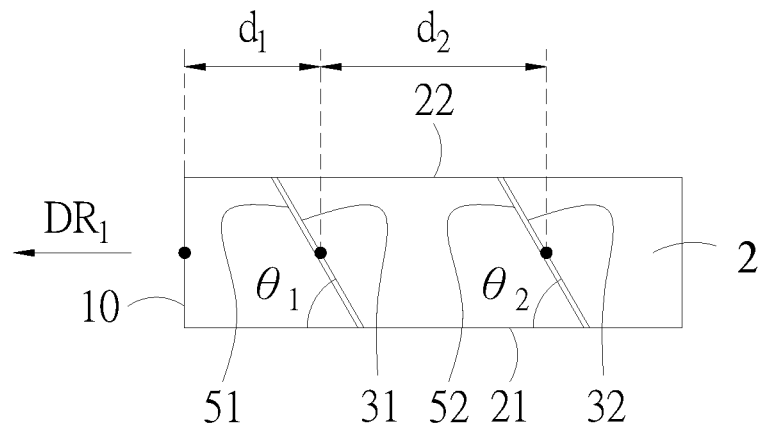
FIG. 3 is a schematic diagram of the structure of the second embodiment according to the light-guide optical element of the present disclosure.

Referring to FIG. 3, which is a schematic diagram of the structure of the second embodiment according to the light-guide optical element of the present disclosure.

As shown in the figure, the transparent light-guide body 2 includes a side surface 10, a first surface 21, a second surface 22, a first inclined surface 31, a second inclined surface 32, a first reflective layer 51, and a second reflective layer 52 (as indicated by different kind of dotted lines). Wherein the side surface 10, the first surface 21, the second surface 22, the first inclined surface 31, and the second inclined surface 32 may be the same as the elements described in the first embodiment. Hence, repeated descriptions are omitted.

The first reflective layer 51 is disposed on the first inclined surface 31, and the second reflective layer 52 is disposed on the second inclined surface 32. The first reflective layer 51 may have higher reflectance than the first inclined surface 31, and the second reflective layer 52 may have higher reflectance than the second inclined surface 32. For instance, for the manufacturing method, the substrate of the transparent light-guide body 1 may be cut at a specific angle to form a plurality of blocks having inclined surfaces so as to form inclined surfaces. Furthermore, coating techniques (e.g., vacuum sputtering or evaporation deposition) are used to coat a film on the aforementioned inclined surface. The film may be formed by a transparent or semi-transparent dielectric material which may be selected from the group consisting of a multi-layer dielectric film, a metal (Al or Ag) oxide reflective film, and a combination thereof. The film may be a single layer or a plurality of layers being stacked.

The first reflective layer 51 and the second reflective layer 52 have a reflectance of 5% to 50% in a wavelength range from 420 nm to 700 nm. Then, the inclined surfaces are connected to one another to form the transparent light-guide body 2 including the reflective layers. The connecting method described herein includes adhering, attaching, etc., but the present disclosure is not limited thereto. Other connecting methods may also be suitably used in the present disclosure.

Figure 4:
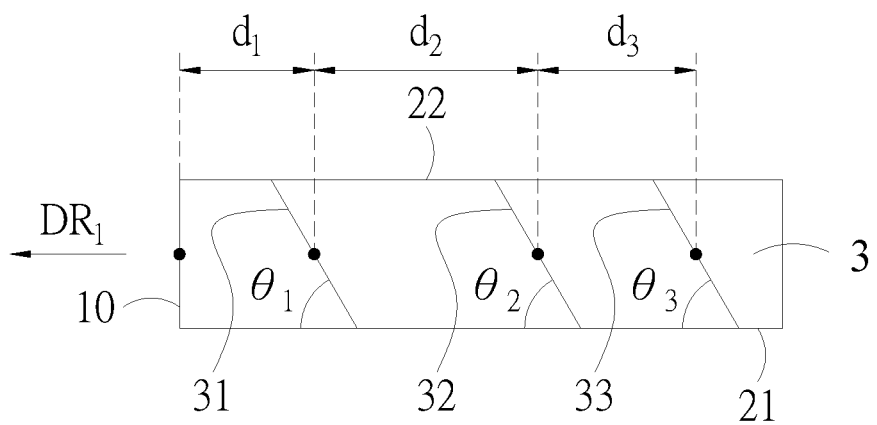
FIG. 4 is a schematic diagram of the structure of the third embodiment according to the light-guide optical element of the present disclosure.

Referring to FIG. 4, which is a schematic diagram of the structure of the third embodiment according to the light-guide optical element of the present disclosure.

As shown in the figure, the transparent light-guide body 3 includes a side surface 10, a first surface 21, a second surface 22, a first inclined surface 31, a second inclined surface 32, and a third inclined surface 33. Wherein, the side surface 10, the first surface 21, the second surface 22, the first inclined surface 31, and the second inclined surface 32 may be similar to the elements described in the first embodiment. Therefore, the relevant content may not be described repeatedly.

In the third embodiment, the third inclined surface 33 extends from the first surface 21 to the second surface 22 and the second inclined surface 32 is disposed between the first inclined surface 31 and the third inclined surface 33. When the third inclined surface 33 is disposed, the third inclined surface 33 forms a third angle $\theta_3$ with the first surface 21. The first angle $\theta_1$ and the second angle $\theta_2$ may be in the range from 35 to 70 degrees. The third inclined surface 33 forms a third angle $\theta_3$ with the first surface 21, and the third angle $\theta_3$ may be in a range from 35 to 70 degrees. For instance, when the first angle $\theta_1$ and the second angle $\theta_2$ are 45 degrees, if the third angle $\theta_3$ is also 45 degrees, the first inclined surface 31, the second inclined surface 32, and the third inclined surface 33 are parallel to one another.

Specifically, when the third inclined surface 33 is disposed, the geometric center of the third inclined surface 33 and the geometric center of the second inclined surface 32 are spaced apart with a third distance $d_3$. As described in the first embodiment, the difference between the second distance $d_2$ and the third distance $d_3$ is also related to the design. When the positions to be focused on is different in terms of product design, the second distance $d_2$ and the third distance $d_3$ may be nearer as the position of the eye E to be focused on is farther. In addition, it should be noted that the second distance $d_2$ is not equal to the third distance $d_3$; that is, the intervals between the inclined surfaces are not equal to one another.

Referring to the embodiment of FIG. 3. A reflective layer on the inclined surfaces may be further disposed in the transparent light-guide body 3 in the present embodiment. For instance, a first reflective layer is coated on the first inclined surface 31, or the first reflective layer is coated by a spraying method. Likewise, the second reflective layer disposed on the second inclined surface 32 and the third reflective layer disposed on the third inclined surface 33 may also be formed in the same manner Wherein the first reflective layer, the second reflective layer, and the third reflective layer respectively have higher reflectance than the first inclined surface, the second inclined surface, and the third inclined surface.

In addition, by changing the composition of the material and the thickness of the coated film, the first reflective layer may have a lower reflectance than the second reflective layer and the third reflective layer, and the third reflective layer may have a higher reflectance than the first reflective layer and the second reflective layer. For instance, the reflectance of the first reflective layer may be 5% to 15%, the reflectance of the second reflective layer may be 20% to 30%, and the reflectance of the third reflective layer may be 35% to 45%.

In the third embodiment, the first inclined surface 31, the second inclined surface 32, and the third inclined surface 33 are arranged in the transparent light-guide body 1 at unequal intervals to reduce the occurrence of bright dark stripes led by the input light $L_i$ not reflected by the inclined surfaces. In addition, films with different compositions or thicknesses may be disposed on the inclined surfaces according to requirements so as to control each of the reflective layers to have different reflectance.

Figure 5:
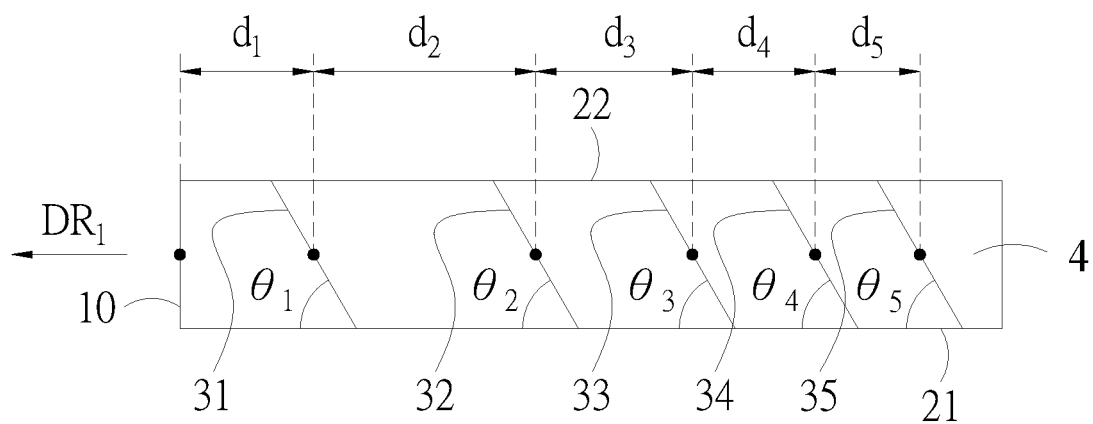
FIG. 5 is a schematic diagram of the structure of the fourth embodiment according to the light-guide optical element of the present disclosure.

Referring to FIG. 5 which is a schematic diagram of the structure of the fourth embodiment according to the light-guide optical element of the present disclosure.

As shown in the figure, the transparent light-guide body 4 includes a side surface 10, a first surface 21, a second surface 22, a first inclined surface 31, a second inclined surface 32, a third inclined surface 33, a fourth inclined surface 34, and a fifth inclined surface 35. Wherein, the side surface 10, the first surface 21, the second surface 22, the first inclined surface 31, the second inclined surface 32, and the third inclined surface 33 may be similar to the elements described in the third embodiment. Therefore, the relevant content may not be described repeatedly.

In the present embodiment, a fourth inclined surface 34 and a fifth inclined surface 35 extending from the first surface 21 to the second surface 22 are further disposed in the transparent light-guide body 4. In the present embodiment, when the fourth inclined surface 34 and the fifth inclined surface 35 are disposed, the fourth inclined surface 34 forms a fourth angle $\theta_4$ with the first surface 21, and the fifth inclined surface 35 forms a fifth angle $\theta_5$ with the first surface 21. In the present embodiment, the first angle $\theta_1$ may be in a range from 35 to 70 degrees; the second angle $\theta_2$ may be in a range from 35 to 70 degrees; the third angle $\theta_3$ may be in a range from 35 to 70 degrees; the fourth angle $\theta_4$ may be in a range from 35 to 70 degrees; the fifth angle $\theta_5$ may be in a range from 35 to 70 degrees. As described in the previous embodiments, when the first angle $\theta_1$, the second angle $\theta_2$, the third angle $\theta_3$, the fourth angle $\theta_4$, and the fifth angle $\theta_5$ are equal, which means that the first inclined surface 31, the second inclined surface 32, the third inclined surface 33, the fourth inclined surface 34, and the fifth inclined surface 35 are parallel to one another.

Specifically, when the fourth inclined surface 34 and the fifth inclined surface 35 exist, the geometric center of the fourth inclined surface 34 and the geometric center of the third inclined surface 33 are spaced apart with a fourth distance $d_4$, and the geometric center of the fifth inclined surface 35 and the geometric center of the fourth inclined surface 34 are spaced apart with a fifth distance $d_5$. It should be noted that the intervals between the inclined surfaces are not equal.

The embodiment of the present disclosure may be described by the following examples, and the detailed parameters of the examples are shown in Table 1.

Table 1

|  | Example 1 | Example 2 | Example 3 | Example 4 | Comparative example 1 | Comparative example 2 |
|---|---|---|---|---|---|---|
| Number of inclined surfaces | 2 | 3 | 4 | 5 | 5 | 5 |
| First angle $\theta_1$ | 45 | 45 | 45 | 45 | 30-27 | 30-27 |
| Second angle $\theta_2$ | 45 | 45 | 45 | 45 | 30-27 | 30-27 |
| Third angle $\theta_3$ | N/A | 45 | 45 | 45 | 30-27 | 30-27 |
| Fourth angle $\theta_4$ | N/A | N/A | 45 | 45 | 30-27 | 30-27 |
| Fifth angle $\theta_5$ | N/A | N/A | N/A | 45 | 30-27 | 30-27 |

Wherein "N/A" means that a parameter is not defined in the example.

As shown in Table 1, it may be known that, compared to the angles of the comparative examples, the angles formed by each of the inclined surfaces with the first surface 21 in the examples of the present disclosure are generally 45 degrees, which may avoid total internal reflection in use and prevent torn or overlapping pictures on part of pictures of each block due to an angle error (tolerance). In addition, as the distances to be focused on the eye E are farther (e.g., >500 mm or more), the intervals among the inclined surfaces are nearer to be equal.

Figure 6:
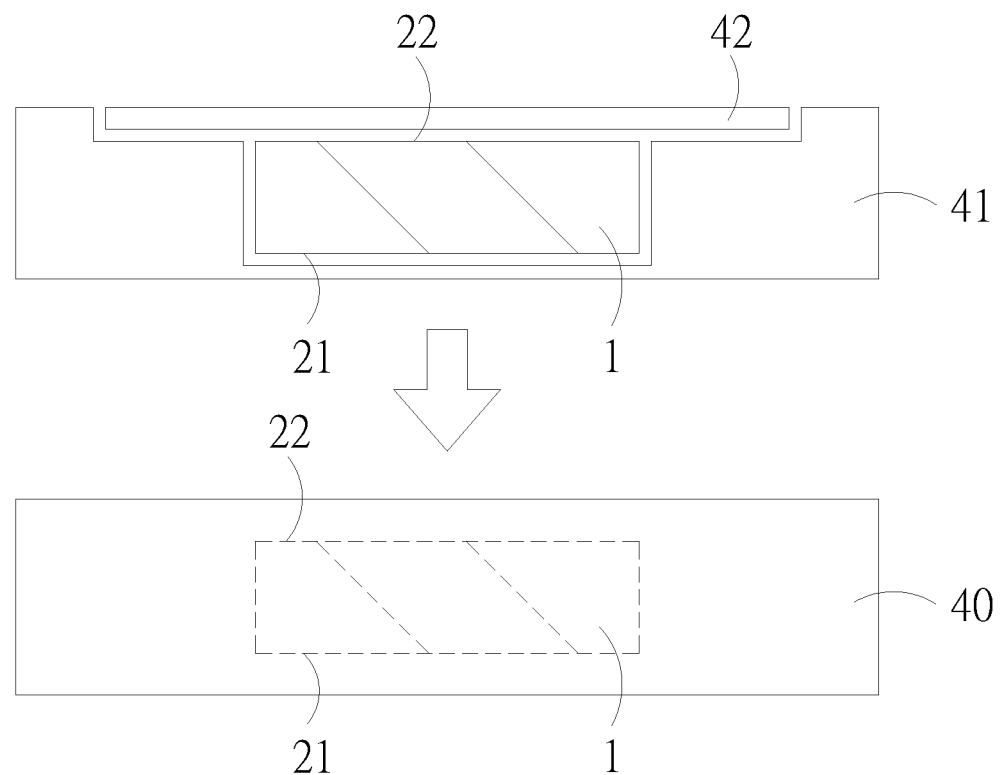
FIG. 6 is a schematic diagram of the structure of the fifth embodiment according to the light-guide optical element of the present disclosure.

Referring to FIG. 6, which is a schematic diagram of the structure of the fifth embodiment according to the light-guide optical element of the present disclosure.

As shown in the figure, the light-guide optical element further includes a transparent member 40 to embed the transparent light-guide body 1, so that the first surface 21 and the second surface 22 are located in the transparent member 40 without contacting the outside. The material of the transparent member 40 may be the same as that of the transparent light-guide body 1, or comprises glass, plastic or resin. For instance, the transparent member substrate 41 having a trench corresponding to the shape of the transparent light-guide body 1 is obtained by cutting; the transparent light-guide body 1 is disposed therein and adhered by an adhesive; moreover, the entire transparent light-guide body 1 is encapsulated using a transparent member plate 42 on the opposite side to make the first surface 21 and the second surface 22 not contact the outside. In another embodiment, the transparent light-guide body 1 is encapsulated using an embedding (or double embedding) technique. For instance, the transparent light-guide body 1 is soaked in a liquid resin in a rectangular mold. The resin may be thermal-curing resin or photo-curing resin. When heat or UV light is applied to make the resin cured and demolded, the transparent light-guide body 1 coated with the resin may be obtained. However, the present disclosure is not limited in a way that all of the surfaces described in the embodiment are coated by the transparent member. It may use the transparent member only coat the first surface 21 and the second surface 22, and the coating process may include related connecting techniques, such as lamination and adhesion. By embedding the transparent light-guide body in the transparent member, the light-guide optical element of the present disclosure may be further protected to prevent the transparent member from being damaged by dust and sharp objects during use.

Figure 7:
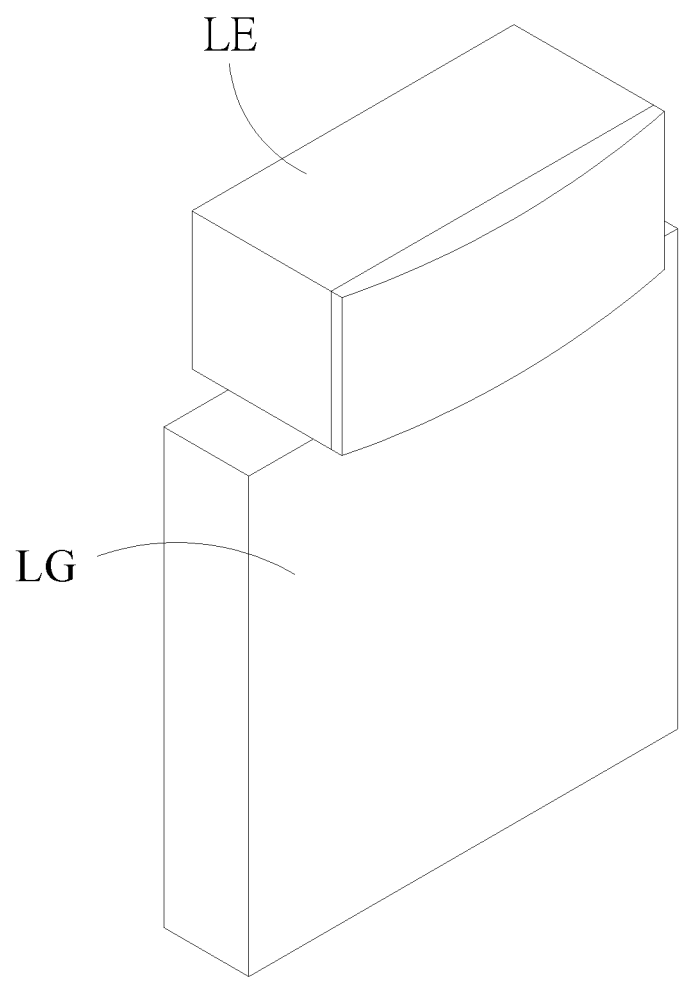
FIG. 7 is a schematic diagram of the light-guide optical element in conjunction with a light engine according to the present disclosure.

Referring to FIG. 7 which is a schematic diagram of the light-guide optical element in conjunction with a light engine according to the present disclosure.

As shown in the figure, the light-guide optical element LG of the present disclosure generally is used in conjunction with the light engine LE. The light engine LE may be a spatial light modulator (SLM), a cathode ray tube (CRT), an organic light emitting diode array (OLED), a liquid crystal display (LCD), a liquid crystal on silicon (LCoS), and a digital light processing (DLP), which are devices known to a person of ordinary skill in the art. For instance, the light engine LE and the light-guide optical element LG are usually connected in an adhesive manner. The light-guide optical element LG of the present disclosure has a thicker thickness, that is, a larger adhesion area. In this case, the parts being adhered are less likely to break or separate.

The present disclosure has specifically described the structure of the light-guide optical element of the present disclosure in accordance with the aforementioned embodiments. However, it should be understood by a person of ordinary skill in the art that modification and alteration may be performed on the embodiments without departing from the technical principles and spirit of the present disclosure. Therefore, the scope of the present disclosure shall be described in the claims mentioned as follows.

What is claimed is:

1. A light-guide optical element, comprising:

a transparent light-guide body comprising a side surface facing a first direction, and a first surface and a second surface which are adjacent to the side surface and face each other, and the transparent light-guide body further comprising:
- a first inclined surface disposed in the transparent light-guide body and extending from the first surface to the second surface, the first inclined surface forming a first angle with the first surface, and a geometric center of the first inclined surface and a geometric center of the side surface are spaced apart with a first distance;
- a second inclined surface disposed in the transparent light-guide body and located at the other side of the first inclined surface facing the side surface, the second inclined surface extending from the first surface to the second surface and forming a second angle with the first surface, and a geometric center of the second inclined surface and the geometric center of the first inclined surface are spaced apart with a second distance;
- a third inclined surface disposed in the transparent light-guide body and located at the other side of the second inclined surface facing the first inclined surface, the third inclined surface extending from the first surface to the second surface, the third inclined surface forming a third angle with the first surface, and a geometric center of the third inclined surface and the geometric center of the second inclined surface are spaced apart with a third distance;
- a first reflective layer disposed on the first inclined surface; and
- a second reflective layer disposed on the second inclined surface;

wherein the side surface is configured as an light receiving surface to receive an input light in a direction parallel to the first direction, such that the input light enters the transparent light-guide body from the side surface and travels within the transparent light-guide body without being reflected by the first surface or the second surface, and the input light is sequentially and partially reflected by the first inclined surface, the second inclined surface and the third inclined surface to form an output light output from the first surface of the transparent light-guide body, wherein the first distance is shorter than the second distance, and the second distance is longer than the third distance, and wherein a reflectance of the first reflective layer is 5% to 15%, and a reflectance of the second reflective layer is 20% to 30%.

2. The light-guide optical element according to claim 1, wherein the first angle is equal to the second angle.

3. The light-guide optical element according to claim 1, wherein the first distance is not equal to the third distance.

4. The light-guide optical element according to claim 3, wherein the first angle, the second angle, and the third angle are equal.

5. The light-guide optical element according to claim 1, further comprising:
- a third reflective layer disposed on the third inclined surface;
- wherein a reflectance of the third reflective layer is 35% to 45%.

6. The light-guide optical element according to claim 1, further comprising a transparent member disposed on the first surface and the second surface of the transparent light-guide body and coating the first surface and the second surface, wherein a material of the transparent member comprises glass plastic or resin.

* * * * *